(12) United States Patent
Ishikura

(10) Patent No.: US 6,411,107 B1
(45) Date of Patent: Jun. 25, 2002

(54) CAPACITANCE TYPE SENSOR

(75) Inventor: Yoshiyuki Ishikura, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 09/485,439

(22) PCT Filed: Jun. 8, 1999

(86) PCT No.: PCT/JP99/03038
§ 371 (c)(1),
(2), (4) Date: Feb. 9, 2000

(87) PCT Pub. No.: WO99/64833
PCT Pub. Date: Dec. 16, 1999

(30) Foreign Application Priority Data

Jun. 9, 1998 (JP) ............................... 10-160420

(51) Int. Cl.$^7$ ............................................. G01R 27/26
(52) U.S. Cl. ................... 324/658; 324/660; 73/862.626
(58) Field of Search ................. 324/658, 660, 324/661, 688; 73/862.626, 862.68, 718, 724, 514.32, 335.04

(56) References Cited

U.S. PATENT DOCUMENTS

| | | | | |
|---|---|---|---|---|
| 2,978,638 A | * | 4/1961 | Wing et al. ................... | 73/503 |
| 4,794,321 A | * | 12/1988 | Dotsko ........................ | 324/661 |
| 5,424,650 A | * | 6/1995 | Frick .......................... | 324/688 |
| 5,717,680 A | * | 2/1998 | Yamano et al. ............. | 369/126 |

FOREIGN PATENT DOCUMENTS

JP          8-062266          3/1996

* cited by examiner

*Primary Examiner*—N. Le
*Assistant Examiner*—Vincent Q. Nguyen
(74) *Attorney, Agent, or Firm*—Blakely Sokoloff Taylor & Zafman

(57) ABSTRACT

This invention includes a first electrode (10a, 10b, 10c, 30) and a second electrode (20a, 20b, 20c, 20d) which are arranged to face each other so as not to come into contact with each other and a gap between which changes in accordance with a change in an amount to be detected, and a signal processor 4 for calculating the amount to be detected on the basis of an electrostatic capacitance formed between the first and second electrodes. The first electrode has a portion (12a, 14a) and a portion (12b, 14b), areas of which that face the second electrode increases and decreases, respectively, upon a positioning error that occurs in a direction (x, y) parallel to the first electrode. These portions have the same area.

18 Claims, 11 Drawing Sheets

CAPACITANCE TYPE SENSOR

TECHNICAL FIELD

The present invention relates to an electrostatic capacitance type sensor for measuring physical and chemical amounts on the basis of an electrostatic capacitance between a plurality of electrodes arranged to face each other and, more particularly, to an electrostatic capacitance type sensor having a means for compensating for an error in electrostatic capacitance based on positioning of the plurality of electrodes.

BACKGROUND ART

An electrostatic capacitance type sensor is known as a device for measuring various types of physical and chemical amounts such as a pressure, temperature, humidity, displacement, variate, and acceleration. The arrangement of a conventional electrostatic capacitance type sensor will be described by way of a pressure sensor for measuring a pressure.

FIG. 13 is a perspective view showing the arrangement of a conventional electrostatic capacitance type sensor.

A recess is formed in one surface of a base substrate 101. The base substrate 101 is bonded to a diaphragm substrate 102 with its rim 101a around the recess. The recess is accordingly closed by the diaphragm substrate 102 to form a capacitance chamber 103.

In the capacitance chamber 103, a stationary electrode 110 is arranged on the base substrate 101 side, and a movable electrode 120 is arranged on the diaphragm substrate 102 side, i.e., on a movable portion 102a of the diaphragm substrate. The electrodes 110 and 120 are connected to the input of a signal processor 104 arranged on the lower surface of the base substrate 101.

When a pressure P is applied to the diaphragm substrate 102, the movable portion 102a displaces in accordance with the pressure P. Since the movable electrode 120 displaces in an interlocked manner to the movable portion 102a, a gap between the stationary electrode 110 and movable electrode 120 changes accordingly, so that an electrostatic capacitance between the two electrodes 110 and 120 changes. On the basis of the capacitance obtained at this time, the signal processor 104 calculates the pressure P.

FIG. 14 is a sectional view showing a section taken along the line XIV—XIV' in the conventional electrostatic capacitance type sensor shown in FIG. 13.

The stationary electrode 110 is made up of an electrode portion 111 and electrode extraction portion 112. An electrode pad 113 is formed in the capacitance chamber 103 on the base substrate 101 side to extract the stationary electrode 110 and connect it to the signal processor 104 shown in FIG. 13. The electrode extraction portion 112 of the stationary electrode 110 is connected to the electrode pad 113.

Similarly, the movable electrode 120 is made up of an electrode portion 121 and electrode extraction portion 122, and is connected to the signal processor 104 through an electrode pad 123 formed in the capacitance chamber 103 on the diaphragm substrate 102 side.

In a process of manufacturing the electrostatic capacitance type sensor shown in FIG. 13, first, the stationary electrode 110 is formed in the recess of the base substrate 101 in accordance with known film formation and photoetching. Similarly, the movable electrode 120 is formed on one surface of the diaphragm substrate 102. The base substrate 101 to which the stationary electrode 110 is attached and the diaphragm substrate 102 to which the movable electrode 120 is attached are bonded to each other. Thus, a capacitor structure comprised of the stationary electrode 110 and movable electrode 120 is formed.

When bonding the substrates 101 and 102 to each other, if they are positioned precisely, the facing area of the two electrodes 110 and 120 becomes as designed, and a desired capacitance can be obtained.

In practice, however, it is difficult to assemble the base substrate 101 and diaphragm substrate 102 as designed, and a positioning error occurs between the electrodes 110 and 120. If the electrodes 110 and 120 are made to have completely the same size, the facing area of the two electrodes 110 and 120 changes largely. Then, a desired capacitance cannot be obtained, and an offset occurs in the sensor.

For this reason, in the electrostatic capacitance type sensor shown in FIG. 13, the stationary electrode 110 is entirely formed smaller than the movable electrode 120, as shown in FIG. 14. Even if a positioning error occurs, the stationary electrode 110 does not move outside a region facing the movable electrode 120, and an offset occurring in the sensor can be suppressed.

In the conventional electrostatic capacitance type sensor shown in FIG. 13, the electrode pad 113 is formed outside the region facing the movable electrode 120, as shown in FIG. 14. If the electrode pad 113 is formed within the region facing the movable electrode 120, the detection precision of the pressure P degrades, and an inconvenience occurs in electrode extraction. For this reason, the electrode extraction portion 112 of the stationary electrode 110 is formed to extend from the region facing the movable electrode 120.

FIGS. 15(a) and 15(b) are schematic diagrams showing a positional relationship between the stationary electrode 110 and movable electrode 120 when a positioning error occurs. Referring to FIGS. 15(a) and 15(b), a direction from the electrode pad 113 toward the electrode portion 111 is defined as an x direction, and a direction from the electrode portion 111 toward the electrode pad 113 is defined as a -x direction.

As shown in FIG. 15(a), when the stationary electrode 110 (i.e., the electrode extraction portion 112) displaces in the direction of arrow x, part 112a of the electrode extraction portion 112 enters the region facing the movable electrode 120. Inversely, as shown in FIG. 15(b), when the stationary electrode 110 displaces in the direction of arrow -x, part 112b of the electrode extraction portion 112 moves outside the region facing the movable electrode 120. The electrode extraction portion 112 also forms an electrostatic capacitance with its portion facing the movable electrode 120. Hence, the electrode extraction portion 112 can produce an offset when a positioning error occurs.

To downsize the electrostatic capacitance type sensor, the electrodes 110 and 120 must be downsized. In the conventional electrostatic capacitance type sensor, when a positioning error occurs, the electrode extraction portion 112 changes the electrostatic capacitance between the two electrodes 110 and 120, as described above. Hence, if the electrodes 110 and 120 are downsized, the offset increases accordingly. As a result, a high-precision compact sensor cannot be obtained.

The present invention has been made in order to solve this problem, and has as its object to decrease an offset in a compact electrostatic capacitance type sensor.

DISCLOSURE OF INVENTION

In order to achieve the above object, the present invention is characterized by comprising first and second electrodes which are arranged to face each other so as not to come into contact with each other and a gap between which changes in accordance with a change in an amount to be detected, and a signal processor connected to the first and second electrodes to calculate the amount to be detected on the basis of an electrostatic capacitance formed between the first and second electrodes, the first electrode having those portions, areas of which that face the second electrode increases and decreases, respectively, upon a positioning error that occurs in a direction parallel to the first electrode, and which portions have the same area. Even if a positioning error occurs, the facing area of the two electrodes does not change, so that the electrostatic capacitance between the electrodes is constant. As a result, an offset in a compact electrostatic capacitance type sensor can be decreased.

In particular, the first electrode may be smaller than the second electrode as a whole.

In this case, an arrangement of the first electrode includes a straight electrode extraction portion and a projection arranged on a side different from the electrode extraction portion and formed to have the same width as that of the electrode extraction portion and parallel to the electrode extraction portion, and the first electrode is arranged to intersect the second electrode with only the electrode extraction portion and projection. Even if a positioning error occurs in a direction parallel to the electrode extraction portion, an increase/decrease in facing area of the two electrodes caused by the electrode extraction portion is compensated for by the projection. Since an adverse influence on the offset caused by the electrode extraction portion can be suppressed, an offset produced in the compact electrostatic capacitance type sensor can be decreased.

In this case, the projection of the first electrode may have a length determined on the basis of a maximum value of the positioning error. As a result, the effect described above can be reliably obtained.

An arrangement of the second electrode comprises a first edge intersecting the electrode extraction portion of the first electrode, and a second edge intersecting the projection of the first electrode. The first and second edges have shapes that overlap each other upon translation, and the second electrode is arranged to intersect the first electrode with only the first and second edges. Since the first and second edges have shapes that overlap each other upon translation, even if a positioning error occurs in a direction perpendicular to the electrode extraction portion, the facing area of the two electrodes does not change, and the electrostatic capacitance between the electrodes is constant. As a result, an offset in a compact electrostatic capacitance type sensor can be decreased.

In this case, the second electrode may comprise a first notch formed by notching from the first edge outwardly, and a second notch formed by notching from the second edge outwardly.

The first and second edges of the second electrodes may have a size and arrangement determined on the basis of a maximum value of the positioning error. As a result, the effect described above can be obtained reliably.

The first edge of the second electrode may be formed straight to perpendicularly intersect the electrode extraction portion of the first electrode, or into an arc. In particular, if the edge is formed into an arc, a change in facing area of the two electrodes with respect to a positioning error in a rotational direction can be decreased. As a result, an offset produced in the electrostatic capacitance type sensor can be decreased.

In the electrostatic capacitance type sensor described above, when the first electrode is smaller than the second electrode as a whole, the first electrode may include a straight electrode extraction portion and a third edge formed on a side different from the electrode extraction portion, the second electrode may include a first edge intersecting only the electrode extraction portion of the first electrode, and a third notch formed by notching to have the same width as that of the electrode extraction portion of the first electrode and to be parallel to the electrode extraction portion of the first electrode, the first and third edges may have shapes that overlap each other upon translation, and the second electrode may be arranged to intersect the first electrode with only the first edge and third notch. Even if a positioning error occurs in a direction parallel to the electrode extraction portion, an increase/decrease in facing area of the two electrodes caused by the electrode extraction portion is compensated for by the third notch. Since the first and third edges have shapes that overlap each other upon translation, even if a positioning error occurs in a direction perpendicular to the electrode extraction portion, the facing area of the two electrodes does not change. As a result, an offset in the compact electrostatic capacitance type sensor can be decreased.

In this case, the first electrode may include a projection including the third edge, and the second electrode may comprise a first notch formed by notching from the first edge outwardly.

The first edge and the third notch may have such sizes and arrangements and the third edge may have such a size that are determined on the basis of a maximum value of the positioning error. As a result, the effect described above can be obtained reliably.

In this case as well, the first edge of the second electrode may be formed straight to perpendicularly intersect the electrode extraction portion of the first electrode, or into an arc. If the edge is formed into an arc, the same effect as that described above can be obtained.

In the electrostatic capacitance type sensor described above, both the first and second electrodes may have rectangular shapes as a whole, the first and second electrodes may have long sides longer than short sides of the second and first electrodes, respectively, and the first and second electrodes may be arranged such that longitudinal and widthwise axes of symmetry of the first electrode overlap widthwise and longitudinal axes of symmetry, respectively, of the second electrode. Even if a positioning error occurs in a direction parallel to each of the respective electrodes, the facing area of the two electrodes does not change, so that the electrostatic capacitance between the electrodes is constant. As a result, an offset in a compact electrostatic capacitance type sensor can be decreased.

In this case, the first and second electrodes may have sizes determined on the basis of a maximum value of the positioning error. As a result, the effect described above can be obtained reliably.

In the electrostatic capacitance type sensor described above, when the first electrode is smaller than the second electrode as a whole, the first electrode may include a straight electrode extraction portion, the second electrodes may comprise a fourth notch including two edges parallel to the electrode extraction portion of the first electrode, and the first electrode may be arranged such that the electrode extraction portion does not intersect the second electrode. Since the facing area of the two electrodes is almost constant regardless of the positioning error, an offset in the electrostatic capacitance type sensor can be decreased.

In this case, the fourth notch of the second electrode may have a size determined on the basis of a maximum value of the positioning error. As a result, the effect described above can be obtained reliably.

The first electrode as another arrangement forms a belt as a whole.

BEST MODE OF CARRYING OUT THE INVENTION

Preferred embodiments of the present invention will be described in detail below.

An electrostatic capacitance type sensor according to the present invention can be used for measurements of various types of physical and chemical amounts, in the same manner as the conventional electrostatic capacitance type sensor. A case will be described wherein the present invention is applied to a pressure sensor.

[First Embodiment]

Figure 1:
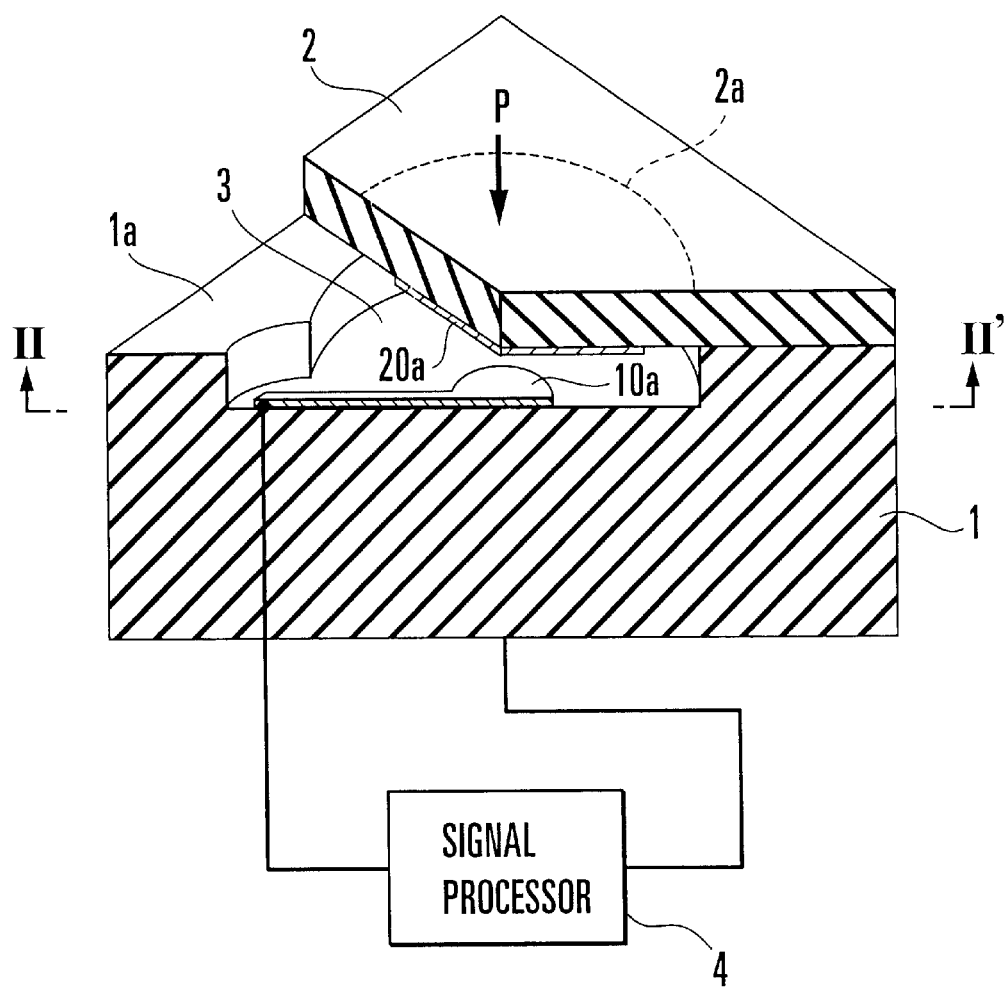
FIG. 1 is a perspective view showing the arrangement of an electrostatic capacitance type sensor according to the first embodiment of the present invention.

FIG. 1 is a perspective view showing the arrangement of an electrostatic capacitance type sensor according to the first embodiment of the present invention.

As shown in FIG. 1, a recess is formed in one surface of a base substrate 1. The base substrate 1 is bonded to a diaphragm substrate 2 with its rim 1$a$ around the recess. The recess is accordingly closed by the diaphragm substrate 2 to form a capacitance chamber 3.

The base substrate 1 and diaphragm substrate 2 are made of an insulating material such as sapphire glass. That portion (movable portion 2$a$) of the diaphragm substrate 2 which is to be in contact with the capacitance chamber 3 is formed to have such a thickness that it displaces vertically in accordance with a pressure P applied to it.

In the capacitance chamber 3, a stationary electrode (first electrode) 10$a$ is arranged on the base substrate 1 side, and a movable electrode (second electrode) 20$a$ is arranged on the diaphragm substrate 2 side, i.e., on the movable portion 2$a$ of the diaphragm substrate 2. The stationary electrode 10$a$ and movable electrode 20$a$ are arranged parallel to each other, and separate from each other so as not to come into contact with each other.

The stationary electrode 10$a$ and movable electrode 20$a$ are connected to the input of a signal processor 4 arranged on the lower surface of the base substrate 1.

When a pressure P is applied to the diaphragm substrate 2, the movable portion 2$a$ of the diaphragm substrate 2 displaces in accordance with the pressure P. Since the movable electrode 20$a$ displaces in an interlocked manner to the movable portion 2$a$, a gap between the stationary electrode 10$a$ and movable electrode 20$a$ changes accordingly, so that an electrostatic capacitance between the two electrodes 10$a$ and 20$a$ changes. On the basis of the capacitance obtained at this time, the signal processor 4 calculates the pressure P.

In the electrostatic capacitance type sensor shown in FIG. 1, the recess is formed in the base substrate 1 in order to form the capacitance chamber 3. Alternatively, the capacitance chamber 3 may be formed either by forming a recess in at least one of the base substrate 1 and diaphragm substrate 2, or by interposing a spacer between the two substrates 1 and 2.

Figure 2:
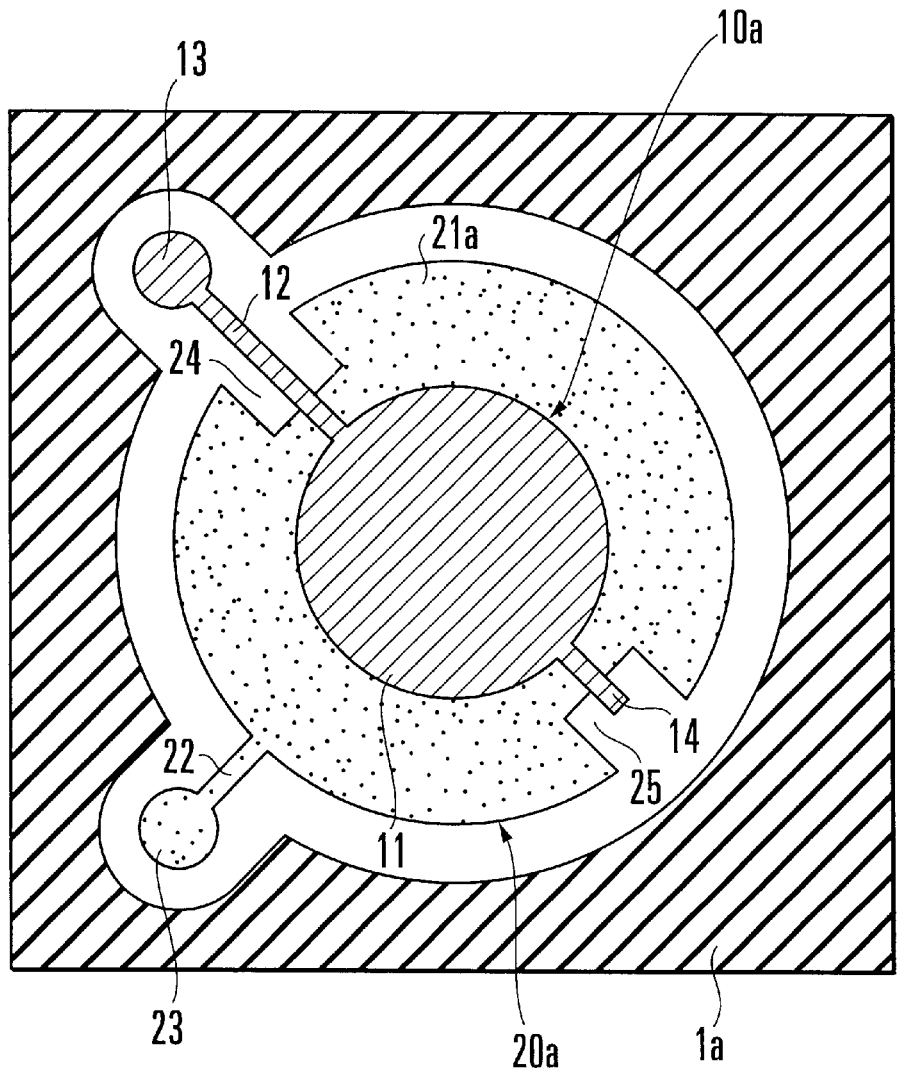
FIG. 2 is a sectional view showing a section taken along the line II—II' in the electrostatic capacitance type sensor shown in FIG. 1.

FIG. 2 is a sectional view showing a section taken along the line II—II' in the electrostatic capacitance type sensor shown in FIG. 1.

The stationary electrode 10$a$ is made up of an electrode portion 11, electrode extraction portion 12, and projection 13. The movable electrode 20$a$ is made up of an electrode portion 21$a$ and electrode extraction portion 22.

The electrode portion 11 of the stationary electrode 10$a$ forms the main body of the stationary electrode 10$a$, and the electrode portion 21$a$ of the movable electrode 20$a$ forms the main body of the movable electrode 20$a$. The respective electrode portions 11 and 21$a$ have circular shapes as a whole. The electrode portion 11 of the stationary electrode 10$a$ is entirely smaller than the electrode portion 21$a$ of the movable electrode 20$a$.

An electrode pad 13 is formed in the capacitance chamber 3 on the base substrate 1 side to extract the stationary electrode 10a and connect it to the signal processor 4 shown in FIG. 1. The electrode pad 13 is formed outside a region facing the movable electrode 20a.

The electrode extraction portion 12 is formed on the electrode portion 11 of the stationary electrode 10a on the electrode pad 13 side. The electrode portion 11 is connected to the electrode pad 13 through the electrode extraction portion 12. The electrode portion 11 of the stationary electrode 10a forms a projection 14 on an opposite side of the electrode extraction portion 12.

An electrode pad 23 is formed in the capacitance chamber 3 on the diaphragm substrate 2 side to extract the movable electrode 20a and connect it to the signal processor 4. The electrode portion 21a of the movable electrode 20a is connected to the electrode pad 23 through the electrode extraction portion 22.

Two notches are formed in the edge of the electrode portion 21a of the movable electrode 20a. A first notch 24 is formed by notching part of that portion of the stationary electrode 10a which faces the electrode extraction portion 12. A second notch 25 is formed by notching part of that portion of the stationary electrode 10a which faces the projection 14.

A facing portion between the stationary electrode 10a, including the electrode extraction portion 12 and projection 14, and the movable electrode 20a forms an electrostatic capacitance.

Figure 3A:
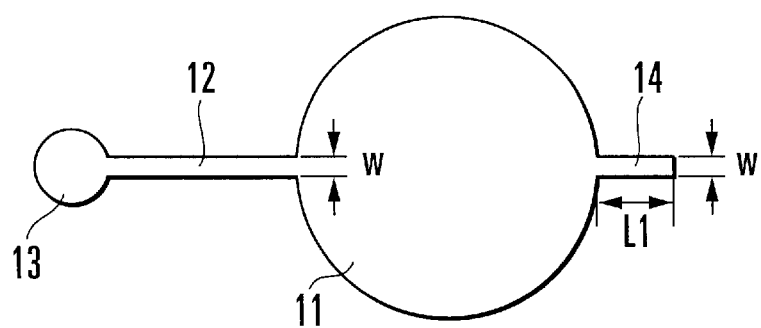
FIG. 3($a$) is a view for explaining the shape and size of a stationary electrode 10$a$, FIG. 3($b$) a view for explaining the shape and size of a stationary electrode 20$a$, and FIG. 3($c$) is a view for defining directions.
Figure 3B:
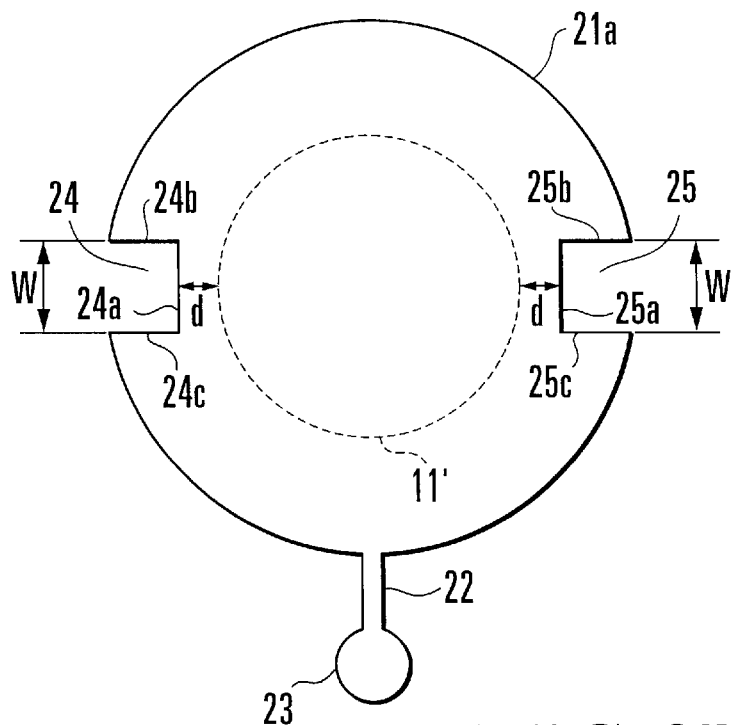
Figure 3C:
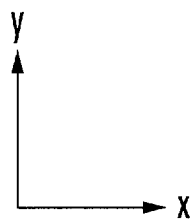

FIG. 3(a) is a view for explaining the shape and size of the stationary electrode 10a, FIG. 3(b) is a view for explaining the shape and size of the stationary electrode 20a, and FIG. 3(c) is a view for defining directions.

Figure 12:
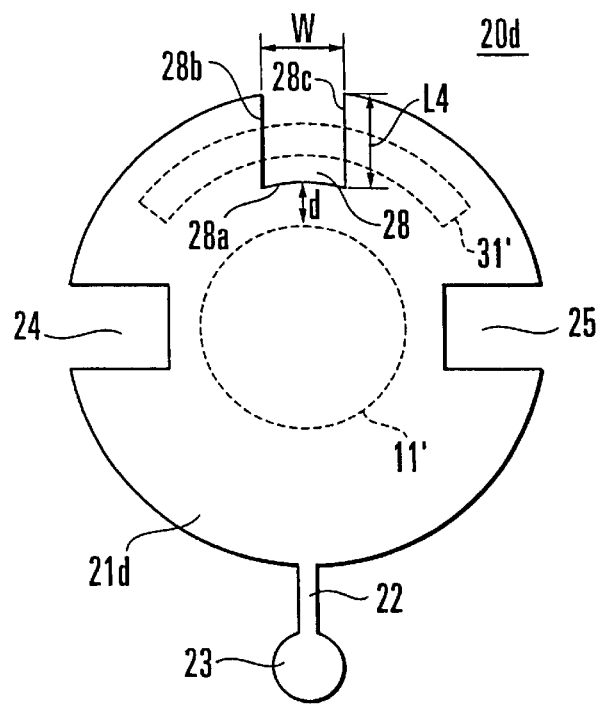
FIG. 12 is a view for explaining the shape and size of the movable electrode 20$d$ shown in FIG. 11.
Figure 13:
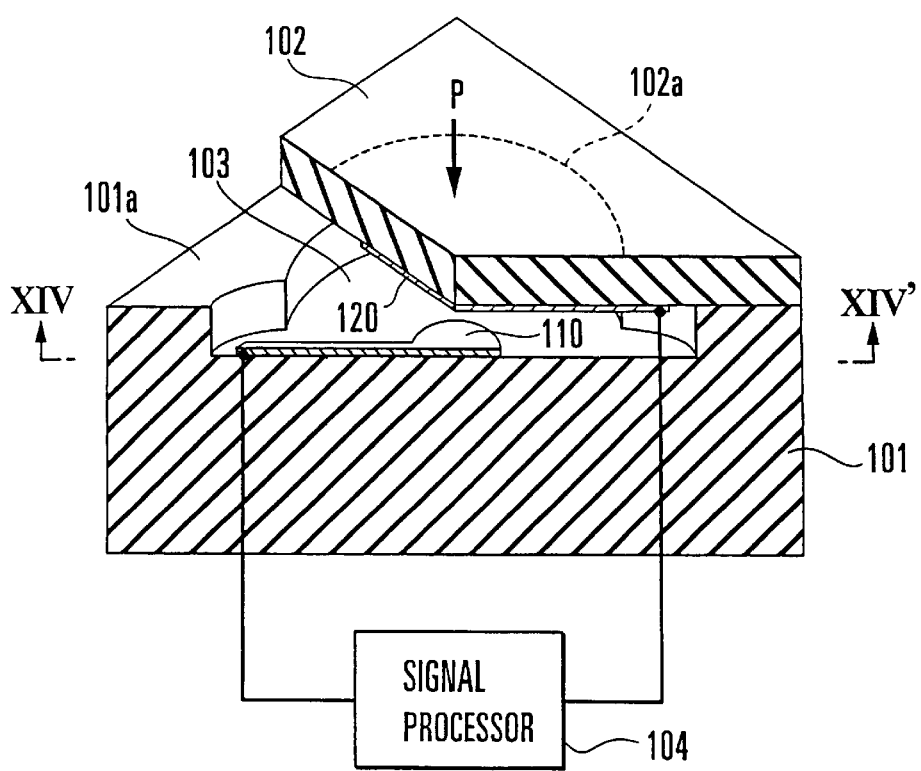
FIG. 13 is a perspective view showing the arrangement of a conventional electrostatic capacitance type sensor.
Figure 14:
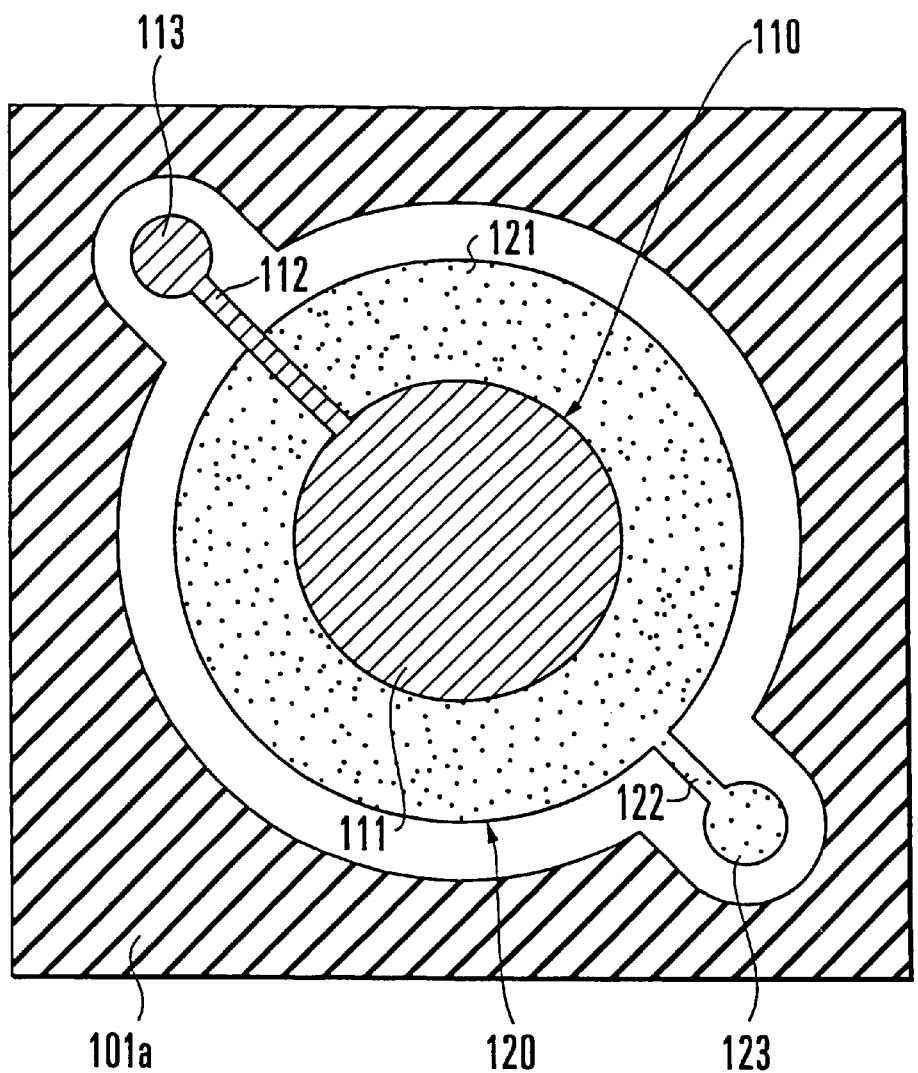
FIG. 14 is a sectional view showing a section taken along the line XIV—XIV' in the electrostatic capacitance type sensor shown in FIG. 13.
Figure 15:
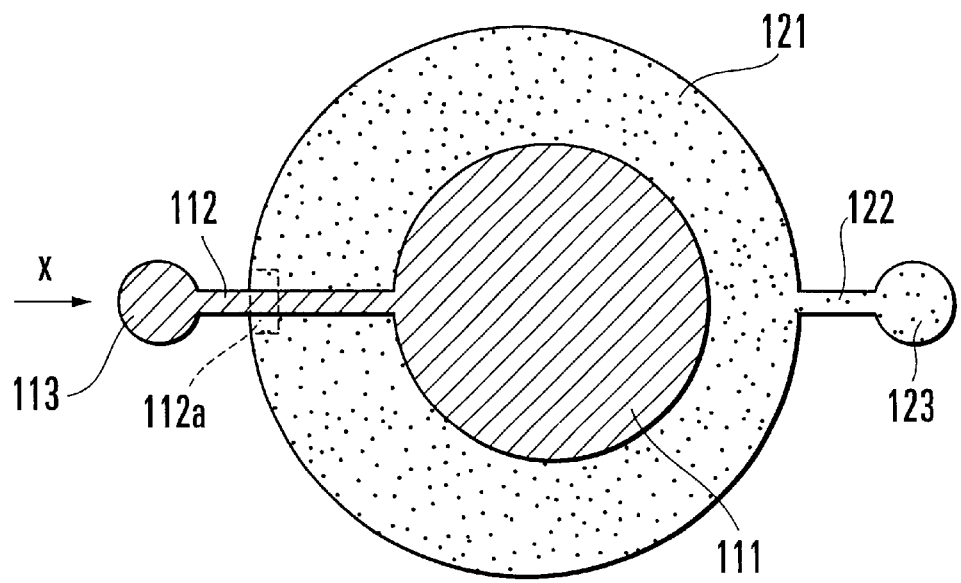
FIGS. 15($a$) and 15($b$) schematic diagrams showing a positional relationship between a stationary electrode 110 and a movable electrode 120 when a positioning error occurs.
Figure 15:
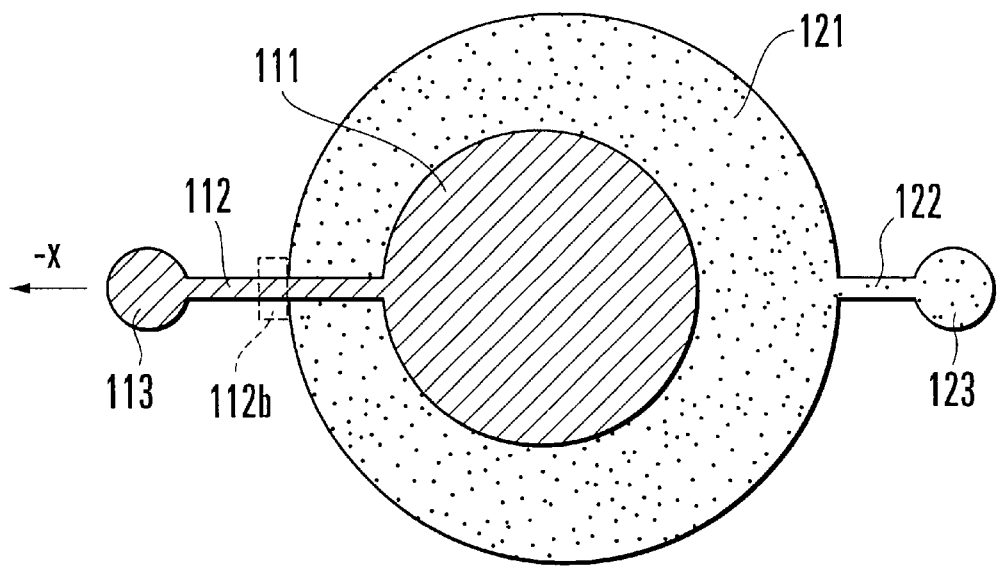

For the sake of descriptive convenience, as shown in FIG. 3(c), a direction from the electrode pad 13 toward the electrode portion 11 of the stationary electrode 10a is defined as an x direction, and a direction obtained by rotating the x direction counterclockwise through 90° is defined as a y direction. Also, assume that the maximum value of a positioning error is $\delta$ in each of the ±x directions and ±y directions. In FIGS. 9 and 12 which will be presented later as well, the x and y directions are defined in the same manner as in FIG. 3(c), and assume that the maximum positioning error is $\delta$ in each of the x and y directions.

The stationary electrode 10a will be described with reference to FIG. 3(a).

The electrode extraction portion 12 of the stationary electrode 10a is formed straight. The width of the electrode extraction portion 12 is defined as w.

The projection 14 is formed straight on the extension of the electrode extraction portion 12. The projection 14 has a width w which is the same as that of the electrode extraction portion 12. A length L1 of the projection 14 will be described later.

The movable electrode 20a will be described with reference to FIG. 3(b). Reference numeral 11' denotes that portion of the movable electrode 20a which faces the electrode portion 11 of stationary electrode 10a.

The notch 24 formed in the electrode portion 21a of the movable electrode 20a includes edges 24a, 24b, and 24c. The edge 24a (first edge) is formed straight to perpendicularly intersect the electrode extraction portion 12 of the stationary electrode 10a. The notch 24 is notched from the edge 24a to the opposite side (i.e., to the outer side) of the region 11' to be parallel to the electrode extraction portion 12. A width W of the notch 24 is set to a value equal to w+2$\delta$([width w of electrode extraction portion 12 of stationary electrode 10a]+[maximum positioning error $\delta$ in y direction]+[maximum positioning error $\delta$ in -y direction]) or more.

Similarly, the notch 25 includes edges 25a, 25b, and 25c. The edge 25a (second edge) is formed straight to perpendicularly intersect the projection 14 of the stationary electrode 10a. The notch 25 is notched from the edge 25a to the opposite side (i.e., to the outer side) of the region 11' to be parallel to the projection 14. A width W of the notch 25 is also set to a value equal to or larger than w+2$\delta$.

The edge 24a of the notch 24 is formed away from the region 11' which faces the electrode portion 11 of the stationary electrode 10a by at least a distance d having the maximum positioning error $\delta$ in the -x direction. Similarly, the edge 25a of the notch 25 is formed away from the facing region 11' by at least a distance d having the maximum positioning error $\delta$ in the x direction.

The length L1 of the projection 14 of the stationary electrode 10a is set to a value equal to or larger than d+$\delta$.

The electrodes 10a and 20a formed in this manner are arranged such that the electrode extraction portion 12 of the stationary electrode 10a intersects the movable electrode 20a at the middle point of the edge 24a, and that the projection 14 of the stationary electrode 10a intersects the edge 25a at the middle point of the movable electrode 20a. Accordingly, the stationary electrode 10a is arranged to intersect the movable electrode 20a with only its electrode extraction portion 12 and projection 14, and the movable electrode 20a is arranged to intersect the stationary electrode 10a with only its edges 24a and 25a.

Figure 4A:
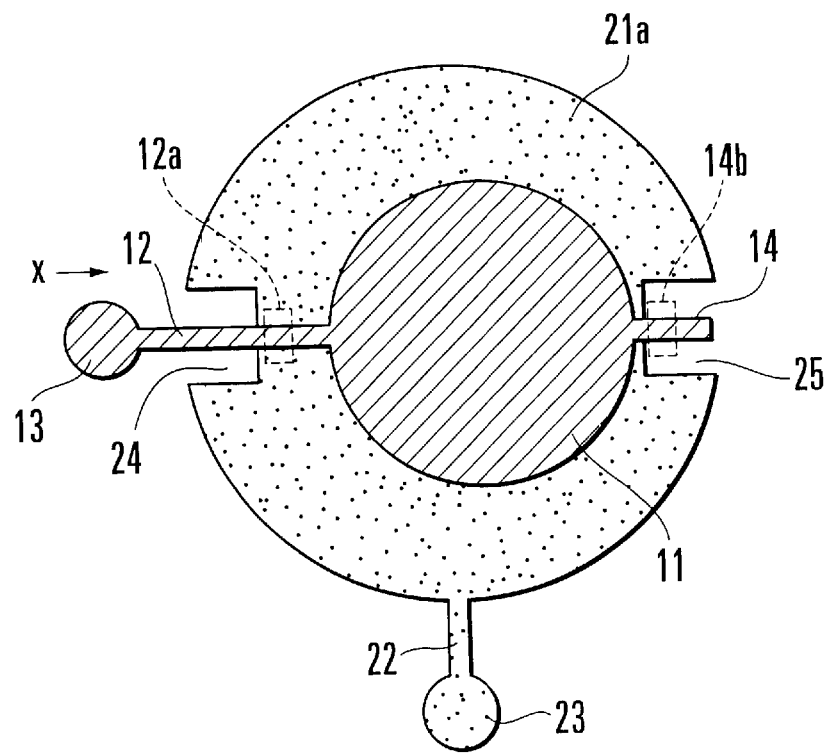
FIG. 4($a$) is a schematic diagram showing a positional relationship between the stationary electrode 10$a$ and movable electrode 20$a$ when a positioning error occurs in an x direction defined in FIG. 3($c$), and FIG. 4($b$) is a schematic diagram showing a positional relationship between the stationary electrode 10$a$ and movable electrode 20$a$ when a positioning error similarly occurs in a -x direction.
Figure 4B:
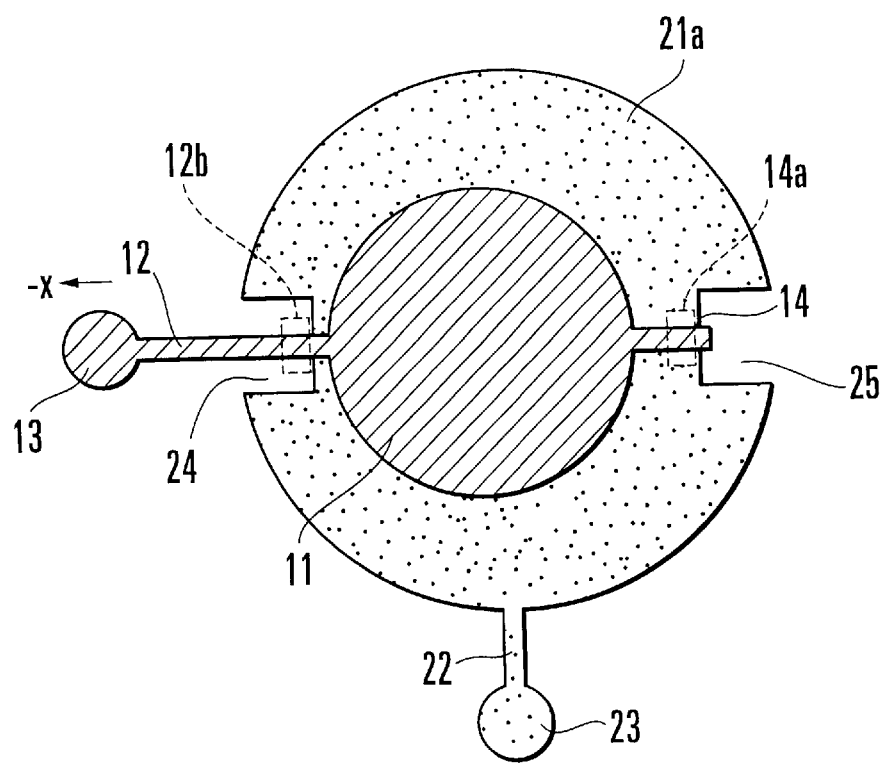

FIG. 4(a) is a schematic diagram showing a positional relationship between the stationary electrode 10a and movable electrode 20a when a positioning error occurs in the x direction defined in FIG. 3(c), and FIG. 4(b) is a schematic diagram showing a positional relationship between the stationary electrode 10a and movable electrode 20a when a positioning error similarly occurs in the -x direction.

As shown in FIG. 4(a), when a positioning error $\delta$ in the x direction occurs in the stationary electrode 10a, the facing area of the stationary electrode 10a and movable electrode 20a increases by that portion 12a in the electrode extraction portion 12 which is surrounded by a broken line, and decreases by that portion 14b in the projection 14 which is surrounded by a broken line. At this time, the electrode portion 11 of the stationary electrode 10a does not extend outside the region facing the movable electrode 20a.

Since the electrode extraction portion 12 and projection 14 are formed on the same straight line and have the same width w, the area of the portion 12a by which the facing area of the two electrodes 10a and 20a increases is equal to that of the portion 14b by which it decreases. Accordingly, a change in facing area which is caused by the electrode extraction portion 12 is compensated for by the projection 14, and the facing area does not change.

As shown in FIG. 4(b), when a positioning error $\delta$ in the -x direction occurs in the stationary electrode 10a, the facing area of the stationary electrode 10a and movable electrode 20a increases by that portion 14a in the projection 14 which is surrounded by a broken line, and decreases by that portion 14b in the electrode extraction portion 12 which is surrounded by a broken line. At this time, the electrode portion 11 of the stationary electrode 10a does not extend outside the region facing the movable electrode 20a. The distal end of the electrode portion 11 remains outside the region facing the movable electrode 20a or at least intersects the edge 25a. Therefore, the facing area of the two electrodes 10a and 20a does not change.

Figure 5:
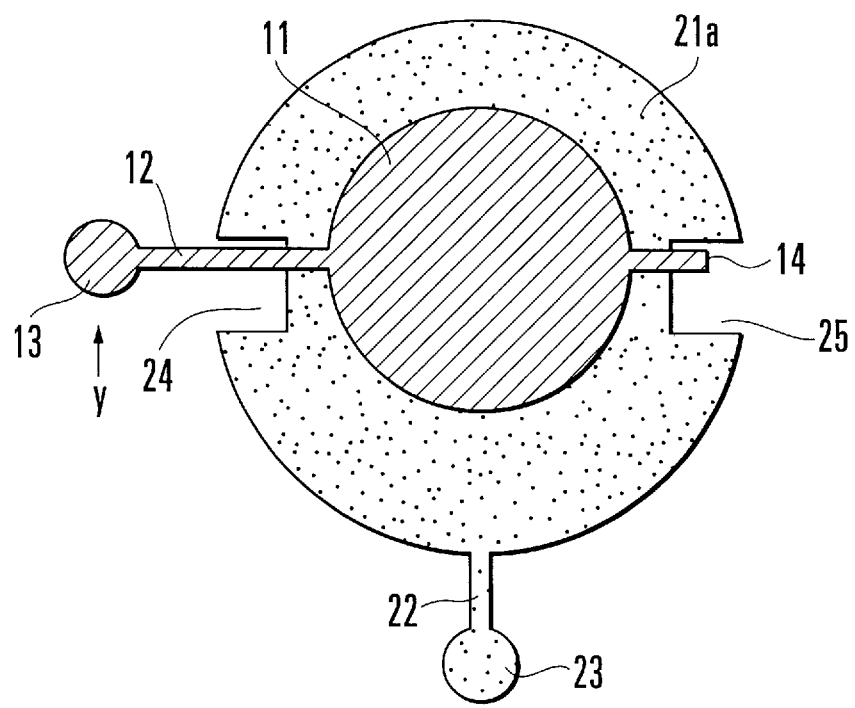
FIG. 5 is a schematic diagram showing a positional relationship between the stationary electrode 10$a$ and movable electrode 20$a$ when a positioning error occurs in a y direction defined in FIG. 3($c$)

FIG. 5 is a schematic diagram showing a positional relationship between the stationary electrode 10a and movable electrode 20a when a positioning error occurs in the y direction defined in FIG. 3(c).

As shown in FIG. 5, when a positioning error δ in the y direction occurs in the stationary electrode 10a, since the edges 24a and 25a of the notches 24 and 25, respectively, of the movable electrode 20a are parallel to each other, the facing area of the two electrodes 10a and 20a does not change. The same applies to a case when a positioning error δ occurs in the -y direction.

In this manner, when a positioning error occurs in the x direction, the y direction, and a direction as a combination of the x and y directions, the influence on the stationary electrode 10a caused by the electrode extraction portion 12 is removed. The facing area of the two electrodes 10a and 20a does not change accordingly, and the electrostatic capacitance between the electrodes 10a and 20a is constant.

It suffices if the notch 24 is formed in the electrode portion 21a of the movable electrode 20a to intersect the electrode extraction portion 12 of the stationary electrode 10a with only its edge 24a. Accordingly, the notch 24 may have such a shape that each of the edges 24b and 24c forms an obtuse angle with the edge 24a. The same applies to the notch 25.

Figure 6:
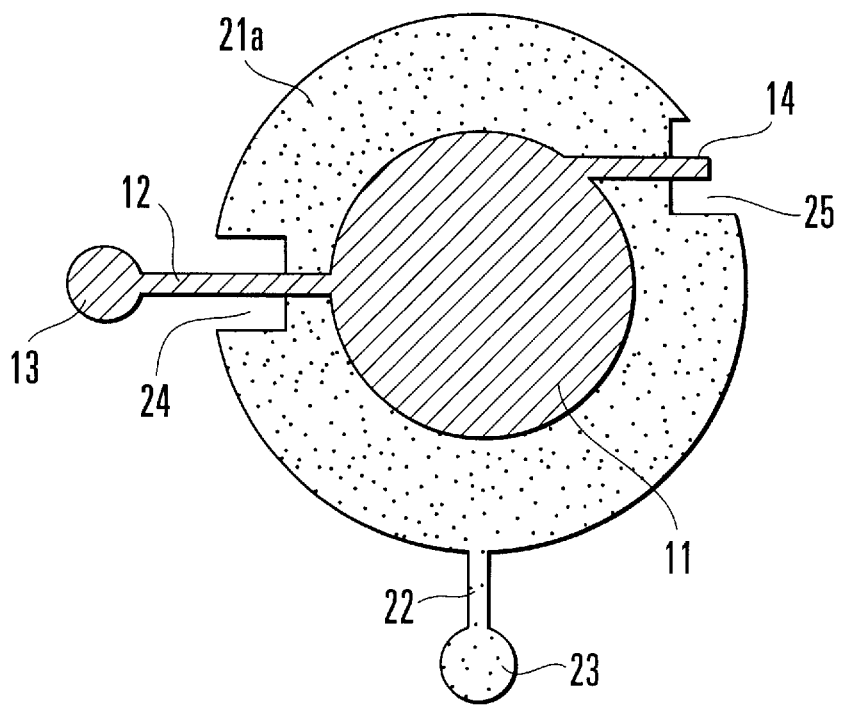
FIG. 6 is a plan view showing another shape and arrangement of the stationary electrode 10$a$ and movable electrode 20$a$.

FIG. 6 is a plan view showing another shape and arrangement of the stationary electrode 10a and movable electrode 20a shown in FIG. 1.

As shown in FIG. 6, the projection 14 of the stationary electrode 10a may be formed on a side different from the electrode extraction portion 12 to be parallel to the electrode extraction portion 12. In this case as well, the notch 25 of the movable electrode 20a is formed to intersect the projection 14 of the stationary electrode 10a with only its edge 25a.

Figure 7:
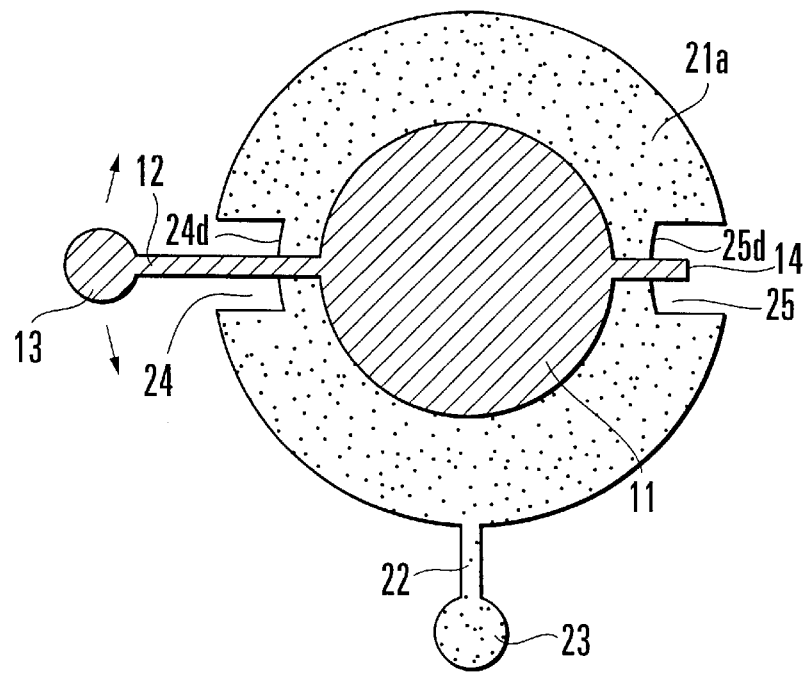
FIG. 7 is a plan view showing still another shape and arrangement of the stationary electrode 10$a$ and movable electrode 20$a$.

FIG. 7 is a plan view showing still another shape and arrangement of the stationary electrode 10a and movable electrode 20a shown in FIG. 1.

It suffices if the edges 24a and 25a of the notches 24 and 25 formed in the movable electrode 20a have shapes that overlap each other when they are translated. Accordingly, as shown in FIG. 7, the edges 24a and 25a may be replaced with arcuate edges 24d and 25d, respectively. An arc in this case is a circumference as part of a circle concentric with the electrode portion 21a of the movable electrode 20a.

When the edges 24a and 25a are replaced with the arcuate edges 24d and 25d, even if a positioning error occurs in the rotational direction indicated by arrows in FIG. 7, a change in facing area of the two electrodes 10a and 20a caused by the positioning error can be suppressed.

[Second Embodiment]

Figure 8:
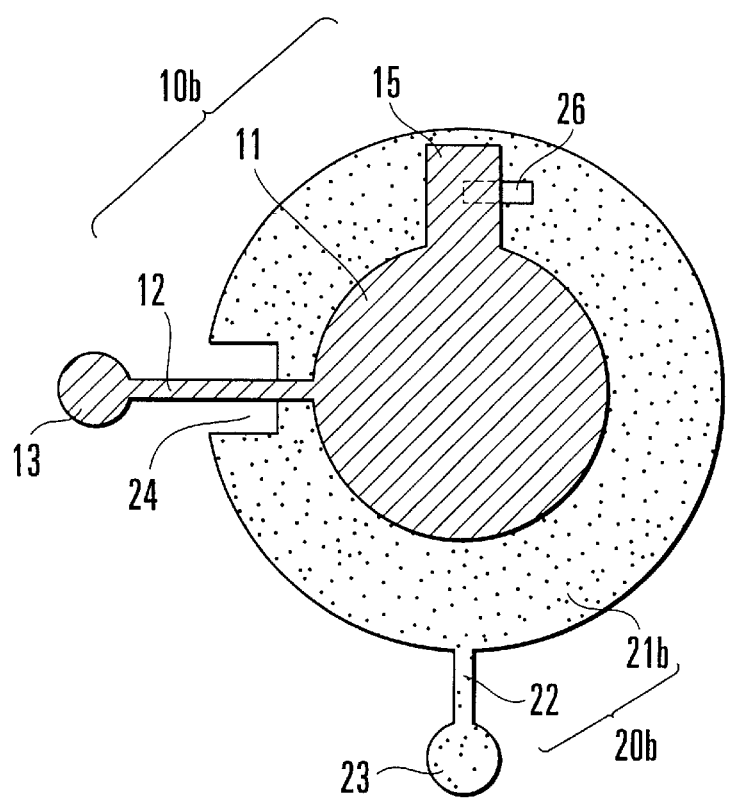
FIG. 8 is a plan view showing a stationary electrode and a movable electrode in an electrostatic capacitance type sensor according to the second embodiment of the present invention.

FIG. 8 is a plan view showing a stationary electrode and a movable electrode in an electrostatic capacitance type sensor according to the second embodiment of the present invention. Referring to FIG. 8, portions identical or equivalent to those in FIGS. 1 to 7 are denoted by the same reference numerals as in FIGS. 1 to 7, and a detailed description thereof will be omitted when necessary. The same applies to the drawings which follow FIG. 8.

A stationary electrode 10b is made up of an electrode portion 11, electrode extraction portion 12, and projection 15. A movable electrode 20b is made up of an electrode portion 21b and electrode extraction portion 22.

The electrode portion 21b of the movable electrode 20b is formed with first and third notches 24 and 26. The third notch 26 is formed by notching part of that portion of the stationary electrode 10b which faces the projection 15.

The facing portion of the stationary electrode 10b, including the electrode extraction portion 12 and projection 15, and the movable electrode 20b forms an electrostatic capacitance.

Figure 9A:
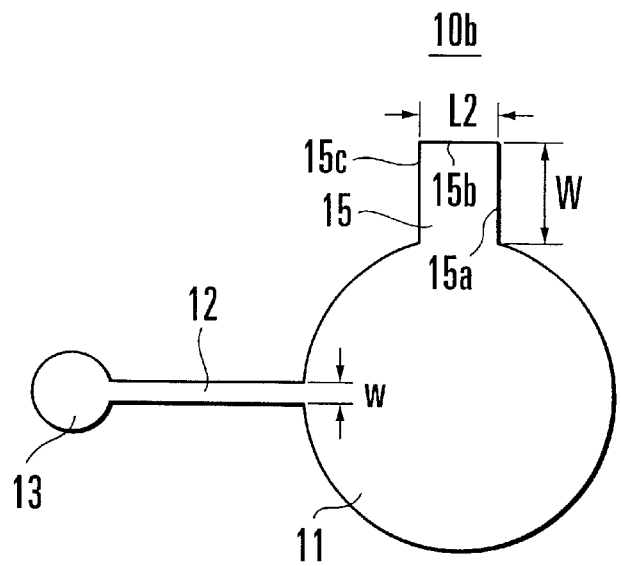
FIG. 9($a$) is a view for explaining the shape and size of a stationary electrode 10$b$, and FIG. 9($b$) is a view for explaining the shape and size of a movable electrode 10$b$.
Figure 9B:
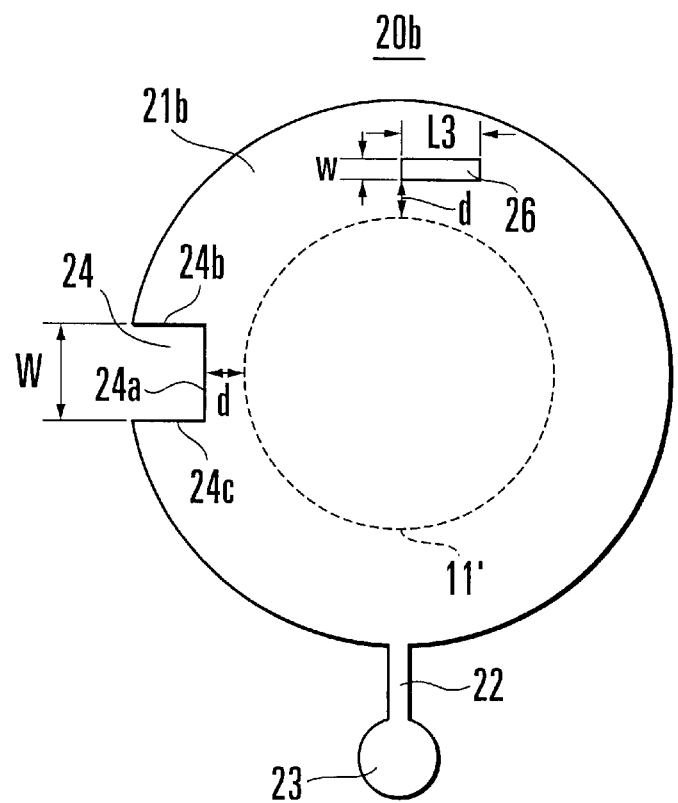

FIG. 9(a) is a view for explaining the shape and size of the stationary electrode 10b shown in FIG. 8, and FIG. 9(b) is a view for explaining the shape and size of the movable electrode 10b shown in FIG. 8.

The arrangement of the movable electrode 20b will be described.

As shown in FIG. 9(b), the notch 26 is formed in the electrode portion 21b of the movable electrode 20b by notching into a belt-like shape to be parallel to the electrode extraction portion 12 of the stationary electrode lob. The notch 26 has the same width W as that of the electrode extraction portion 12. A length L3 of the notch 26 is set to a value equal to or larger than 2δ ([maximum positioning error δ in x direction] +[maximum positioning error δ in -x direction])

The arrangement of the stationary electrode 10b will be described.

As shown in FIG. 9(a), the projection 15 of the stationary electrode 10b has a rectangular shape as a whole, and includes edges 15a, 15b, and 15c. The edge (third edge) 15a is located on a side different from the electrode extraction portion 12, and is formed straight to perpendicularly intersect the notch 26 of the stationary electrode 20b. The edge 15b is an edge on a side away from the electrode portion 11, and the edge 15c is an edge on the same side as the electrode extraction portion 12.

The width (i.e., the length of the edges 15a and 15c) of the projection 15 is set to be equal to a width W of the notch 24 of the movable electrode 20b. A length (i.e., the length of the edge 15b) of the projection 15 is set to a value equal to or larger than the length L3 of the notch 26.

The notch 26 of the movable electrode 20b is formed at such a position that it intersects the edge 15a of the stationary electrode 10b and overlaps the projection 15 of the stationary electrode 10b by δ in the x direction. Regarding the notch 26 shown in FIG. 9(b), it is formed to be away from a region 11' which faces the electrode portion 11 of the stationary electrode 10b by at least a distance d having the maximum positioning error δ in the y direction.

The electrodes 1b and 20b formed in this manner are arranged such that the electrode extraction portion 12 of the stationary electrode 10b intersects the movable electrode 20b at the middle point of an edge 24a and that the notch 26 of the movable electrode 20b intersects the stationary electrode 10b at the middle point of the third edge 15a. Therefore, the movable electrode 20b is arranged such that it intersects the stationary electrode 10b with only its edge 24a and notch 26, that its edge 24 intersects only the electrode extraction portion 12 of the stationary electrode 10b, and that its notch 26 intersects with only the edge 15a of the stationary electrode 10b.

At this time, even if a positioning error δ in the ±x direction occurs in the stationary electrode 10b, the projection 15 of the stationary electrode 10b intersects the notch 26 of the movable electrode 20b with only its edge 15a. Accordingly, a change in facing area of the electrode extraction portion 12 of the stationary electrode 10b and the movable electrode 20b is compensated for by the projection 15 of the stationary electrode 10b and the notch 26 of the movable electrode 20b, so that the facing area of the two electrodes 10b and 20b does not change.

Even if a positioning error δ in the ±y direction occurs in the stationary electrode 10b, the notch 26 of the movable electrode 20b neither extend outside the stationary electrode 10b from the edge 15b side of the projection 15 nor face the electrode portion 11 of the stationary electrode 10b. As a result, the facing area of the two electrodes 10b and 20b does not change.

In this manner, when a positioning error occurs in the x direction, the y direction, and a direction as a combination of the x and y directions, the influence on the stationary electrode 10b caused by the electrode extraction portion 12 is removed. The facing area of the two electrodes 10b and 20b does not change accordingly, and the electrostatic capacitance between the electrodes 10b and 20b is constant.

It suffices if the projection 15 of the stationary electrode 10b and the notch 26 in the movable electrode 20a are formed to intersect each other only on the edge 15a side of the projection 15. Accordingly, the projection 15 and notch 26 may be formed on that side of the stationary electrode 10b which is opposite to the electrode extraction portion 12.

It suffices if the edge 15a of the projection 15 has a shape that overlaps the first edge 24a of the first notch 24 formed in the movable electrode 20b when it is translated. Accordingly, the edges 15a and 24a may have arcuate shapes.

[Third Embodiment]

Figure 10:
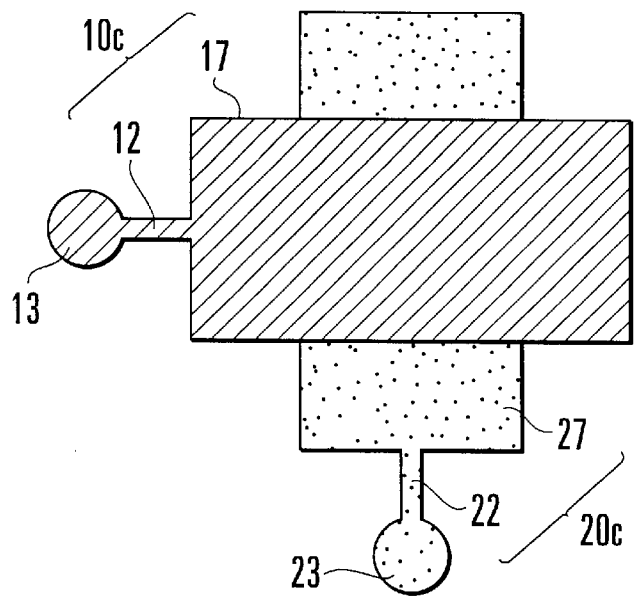
FIG. 10 is a plan view showing a stationary electrode and a movable electrode in an electrostatic capacitance type sensor according to the third embodiment of the present invention.

FIG. 10 is a plan view showing a stationary electrode and a movable electrode in an electrostatic capacitance type sensor according to the third embodiment of the present invention.

A stationary electrode 10c is made up of an electrode portion 17 and electrode extraction portion 12. A movable electrode 20c is made up of an electrode portion 27 and electrode extraction portion 22.

The electrode portion 17 of the stationary electrode 10c has a rectangular shape, and the electrode extraction portion 12 is formed on one short side of the electrode portion 17. The same applies to the movable electrode 20c.

Note that the long sides of the electrode portion 17 of the stationary electrode 10c are formed to be longer than the short sides of the electrode portion 27 of the movable electrode 20c by at least 2δ. The same applies to the movable electrode 20c.

The electrodes 10c and 20c are arranged such that the longitudinal and widthwise axes of symmetry of the electrode portion 17 respectively overlap the widthwise and longitudinal axes of symmetry of the electrode portion 27.

Hence, when a positioning error occurs in the x direction, the y direction, and a direction as a combination of the x and y directions, the facing area of the two electrodes 10c and 20c does not change. Since the facing portions of the electrode portions 17 and 27 of the electrodes 10c and 20c form an electrostatic capacitance, even if a positioning error occurs, the electrostatic capacitance between the electrodes 10c and 20c is constant.

Although the electrostatic capacitance may be adversely influenced by the non-facing portions of the electrode portions 17 and 27, it can be neglected.

[Fourth Embodiment]

Figure 11:
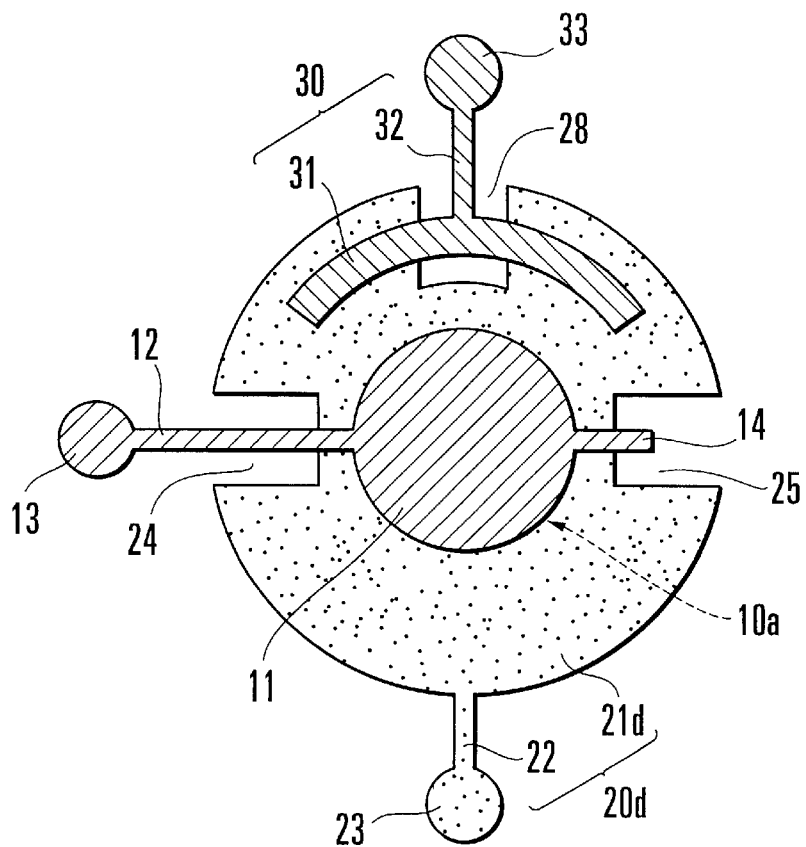
FIG. 11 is a plan view showing the shape and arrangement a stationary electrode and a movable electrode in an electrostatic capacitance type sensor according to the fourth embodiment of the present invention.

FIG. 11 is a plan view showing the shape and arrangement of a stationary electrode and a movable electrode in an electrostatic capacitance type sensor according to the fourth embodiment of the present invention. The electrostatic capacitance type sensor, the shapes of the electrodes and the like of which are shown in FIG. 11, is obtained by adding a stationary electrode 30 as a constituent element to the electrostatic capacitance type sensor shown in FIG. 1.

An electrode portion 11 of a stationary electrode 10a is arranged at the central portion in a capacitance chamber 3, shown in FIG. 1, on a base substrate 1 side, to serve as a sensor electrode. An electrode portion 31 of the stationary electrode 30 is arranged in the capacitance chamber 3 on the base substrate 1 side edge, to serve as a reference electrode. A movable electrode 20d is arranged in the capacitance chamber 3 on a diaphragm substrate 2 side, to serve as a common electrode for the stationary electrodes 10a and 30.

The electrodes 10a, 20d, and 30 are connected to a signal processor 4 identical to that shown in FIG. 1 through electrode pads 13, 23, and 33, respectively.

In the case of a pressure sensor, a reference capacitance generated between the electrodes 30 and 20d is used to correct a change in sensed capacitance which is caused by a change in dielectric constant between the electrodes 10a and 20d when the humidity or the like between the electrodes 10a and 20d changes.

The stationary electrode 10a shown in FIG. 11 is identical to that shown in FIG. 1, and a detailed description thereof will accordingly be omitted.

The movable electrode 20d is made up of an electrode portion 21d and electrode extraction portion 22. The stationary electrode 30 is made up of an electrode portion 31 and electrode extraction portion 32.

The electrode portion 21d of the movable electrode 20d has a circular shape as a whole. First, second, and fourth notches 24, 25, and 28 are formed in the periphery of the electrode portion 21d. The notch 28 is formed by notching that portion of the stationary electrode 30 which faces the electrode extraction portion 32, and a portion around it.

The electrode portion 31 of the stationary electrode 30 forms a belt-like shape (width: w2) including an arc. An arc in this case is a circumference as part of a circle concentric with the electrode portion 21d of the movable electrode 20d. The electrode extraction portion 32 of the stationary electrode 30 is formed straight (width: w1).

The facing portions of the stationary electrode 30 and movable electrode 20d form a capacitance.

FIG. 12 is a view for explaining the shape and size of the movable electrode 20d shown in FIG. 11. Referring to FIG. 12, reference numeral 31' denotes that portion of the stationary electrode 30 which faces the electrode portion 31.

The notch 28 of the electrode portion 21d of the movable electrode 20d includes edges 28a, 28b, and 28c. The edge 28a is formed into an arc to be away from the region 11' of the stationary electrode 10a which faces the electrode portion 11 by at least a distance d. An arc in this case is a circumference as part of a circle concentric with the electrode portion 21d of the movable electrode 20d.

The notch 28 is formed by notching from the edge 28a to a side opposite to the facing region 11' into a belt-like shape to be parallel to the electrode extraction portion 32 of the stationary electrode 30. Accordingly, the edges 28b and 28c of the notch 28 are formed parallel to the electrode extraction portion 32 of the stationary electrode 30.

The notch 28 is formed to have the same width W as that of the notches 24 and 25. A length (i.e., the length of the edges 28b and 28c) L4 of the notch 28 is set to a value equal to or larger than w2+2δ ([width w2 of electrode portion 31 of stationary electrode 30]+[maximum positioning error δ in y direction]+[maximum positioning error δ in -y direction]).

The electrodes 20d and 30 formed in this manner are arranged such that the electrode extraction portion 32 of the stationary electrode 30 overlaps the axis of symmetry of the notch 28 of the movable electrode 20d and that the electrode portion 31 of the stationary electrode 30 intersects the edges 28b and 28c of the movable electrode 20d at their middle points.

At this time, even if a positioning error δ in the ±x direction occurs in the stationary electrode 30, the electrode extraction portion 32 of the stationary electrode 30 does not face the electrode portion 21d of the movable electrode 20d. The facing area of the electrode portions 21d and 31 of the two electrodes 20d and 30 increases on one side of the electrode portion 31 and decreases on the other side thereof. The amounts of increase and decrease in facing area at this time are substantially equal to each other. Accordingly, the facing area of the two electrodes 20d and 30 is almost constant.

Even if a positioning error δ in the ±y directions occurs in the stationary electrode 30, the stationary electrode 30 intersects the movable electrode 20d with only the edges 28b and 28c. More specifically, the electrode portion 31 of the stationary electrode 30 does not extend from the edge of the electrode portion 21d of the movable electrode 20d or exceed the edge 28a of the movable electrode 20d. Hence, the facing area of the two electrodes 10a and 20d does not change.

In this manner, the electrostatic capacitance between the electrodes 20d and 30 is almost constant against a positioning error in the x direction, the y direction, and the direction as the combination of the x and y directions.

In the electrostatic capacitance sensor shown in FIG. 1, the electrode portion 11 of the stationary electrode 10a is formed smaller than the electrode portion 21a of the movable electrode 20a (in this case, the stationary electrode 10a is the first electrode, and the movable electrode 20a is the second electrode). Alternatively, the electrode portion 11 of the stationary electrode 10a may be formed larger than the electrode portion 21a of the movable electrode 20a (in this case, the stationary electrode 10a is the second electrode, and the movable electrode 20a is the first electrode). In this case, if the stationary electrode 10a has the shape shown in FIG. 3(b) and the movable electrode 20a has the shape shown in FIG. 3(a), the same effect as that obtained with the electrostatic capacitance type sensor shown in FIG. 1 can be obtained. The same applies to the electrostatic capacitance type sensors shown in FIGS. 8 and 11.

The electrodes 10a and 20a of the electrostatic capacitance type sensor shown in FIG. 1 can be applied to an electrostatic capacitance type sensor, which has two capacitor structures and in which an electrostatic capacitance in one capacitor structure and that in the other capacitor structure increases and decreases, respectively, against a pressure P applied to the diaphragm substrate 2 shown in FIG. 1. The same applies to the electrodes 10b and 20b, and 10c and 20c shown in FIGS. 8 and 10, respectively.

In the electrostatic capacitance type sensor having the two capacitor structures, if one capacitor structure is made up of the electrodes 10a, 20d, and 30 shown in FIG. 11, the other capacitor structure must be made up of the electrodes 10a to 10c, or 20a to 20c shown in FIG. 1, 8, or 10.

Industrial Applicability

As has been described above, the electrostatic capacitance type sensor according to the present invention is useful as an electrostatic capacitance type sensor having two electrodes, the facing area of which can be changed by a positioning error. The electrostatic capacitance type sensor according to the present invention can be applied to the pressure sensors described in the first to fourth embodiments as well as to sensors for measuring various types of physical and chemical amounts such as a temperature, humidity, displacement, variate, and acceleration.

What is claimed is:

1. An electrostatic capacitance type sensor comprising:
   first and second electrodes which are positioned opposite each other so as not to come into contact with each other; and
   a signal processor connected to said first and second electrodes to determine a measure of an electrostatic capacitance formed between said first and second electrodes,
   said first electrode having first and second portions defined such that an area of the first portion that faces said second electrode increases and an area of the second portion that faces said second electrode decreases in the same amount upon a positioning error that occurs in a direction parallel to said first electrode.

2. An electrostatic capacitance type sensor according to claim 1, wherein
   said first electrode includes
   a straight electrode extraction portion being said first portion and
   a projection being said second portion arranged on a side different from said electrode extraction portion and formed to have the same width as that of said electrode extraction portion, and
   said first electrode is arranged to extend beyond said second electrode in a direction parallel to said first electrode with only said electrode extraction portion and projection.

3. An electrostatic capacitance type sensor according to claim 2, wherein
   said projection of said first electrode has a length determined on the basis of a maximum value of the positioning error.

4. An electrostatic capacitance type sensor according to claim 2, wherein
   said second electrode comprises
   a first notch formed in an outer periphery thereof and inside which said first edge is formed, and
   a second notch formed in an outer periphery thereof and inside which said second edge is formed.

5. An electrostatic capacitance type sensor according to claim 2, wherein
   said second electrode comprises
   a first edge beyond which said electrode extraction portion of said first electrode extends, and
   a second edge beyond which said projection of said first electrode extends,
   said first and second edges have similar shapes, and
   said second electrode is arranged such that said first electrode extends beyond it, in a direction parallel to said first electrode, only over said first and second edges.

6. An electrostatic capacitance type sensor according to claim 5, wherein said first and second edges of said second electrodes have a size and arrangement determined on the basis of a maximum value of the positioning error.

7. An electrostatic capacitance type sensor according to claim 5, wherein said first edge of said second electrode is formed straight and perpendicular to said electrode extraction portion of said first electrode.

8. An electrostatic capacitance type sensor according to claim 5, wherein said first edge of said second electrode is formed into an arc.

9. An electrostatic capacitance type sensor according to claim 1, wherein said first electrode includes
   a straight electrode extraction portion being said first portion and said second portion has an edge formed on a side different from said electrode extraction portion,
said second electrode includes
   a first edge beyond which said electrode extraction portion of said first electrode extends in a direction parallel to said first electrode, and
   a slot having the same width as that of said electrode extraction portion of said first electrode and to be parallel to said electrode extraction portion of said first electrode,
   said first edge and said second portion edge have shapes that are similar, and
   said second electrode is arranged such that said first electrode extends beyond it, in a direction parallel to said first electrode, only over said first edge and said slot.

10. An electrostatic capacitance type sensor according to claim 9, wherein
   said first electrode includes a projection being said second portion and including said second portion edge, and
   said second electrode comprises a first notch formed in an outer periphery thereof and inside which said first edge is formed.

11. An electrostatic capacitance type sensor according to claim 9, wherein an arrangement and size of said first edge and said slot and said second portion edge are determined on the basis of a maximum value of the positioning error.

12. An electrostatic capacitance type sensor according to claim 9 wherein said first edge of said second electrode is formed straight and perpendicular to said electrode extraction portion of said first electrode.

13. An electrostatic capacitance type sensor according to claim 9, wherein said first edge of said second electrode is formed into an arc.

14. An electrostatic capacitance type sensor according to claim 1, wherein
   both said first and second electrodes have rectangular shapes as a whole,
   said first and second electrodes have long sides longer than short sides of said second and first electrodes, respectively, and
   said first and second electrodes are arranged such that longitudinal and widthwise axes of symmetry of said first electrode overlap widthwise and longitudinal axes of symmetry, respectively, of said second electrode.

15. An electrostatic capacitance type sensor according to claim 14, wherein said first and second electrodes have sizes determined on the basis of a maximum value of the positioning error.

16. An electrostatic capacitance type sensor according to claim 1 wherein
   said first electrode further includes a straight electrode extraction portion,
   said second electrodes further comprises a notch including two edges parallel to said electrode extraction portion of said first electrode, and
   said first electrode is arranged such that said electrode extraction portion does not extend over said second electrode.

17. An electrostatic capacitance type sensor according to claim 16, wherein said notch of said second electrode has a size determined on the basis of a maximum value of the positioning error.

18. An electrostatic capacitance type sensor according to claim 16, wherein said first electrode forms a belt as a whole.

* * * * *

UNITED STATES PATENT AND TRADEMARK OFFICE
CERTIFICATE OF CORRECTION

PATENT NO. : 6,411,107 B1
DATED : June 25, 2002
INVENTOR(S) : Ishikura

It is certified that error appears in the above-identified patent and that said Letters Patent is hereby corrected as shown below:

Column 14,
Line 18, please delete "that occurs in a direction parallel to said first electrode." and insert -- that occurs in a direction parallel to said first electrode wherein said first electrode is smaller than said second electrode as a whole. --.

Signed and Sealed this

Fourth Day of January, 2005

JON W. DUDAS
*Director of the United States Patent and Trademark Office*